April 1, 1958  W. HÜTTER ET AL  2,828,650
DIFFERENTIAL TRANSMISSION ARRANGEMENT
Filed May 21, 1956
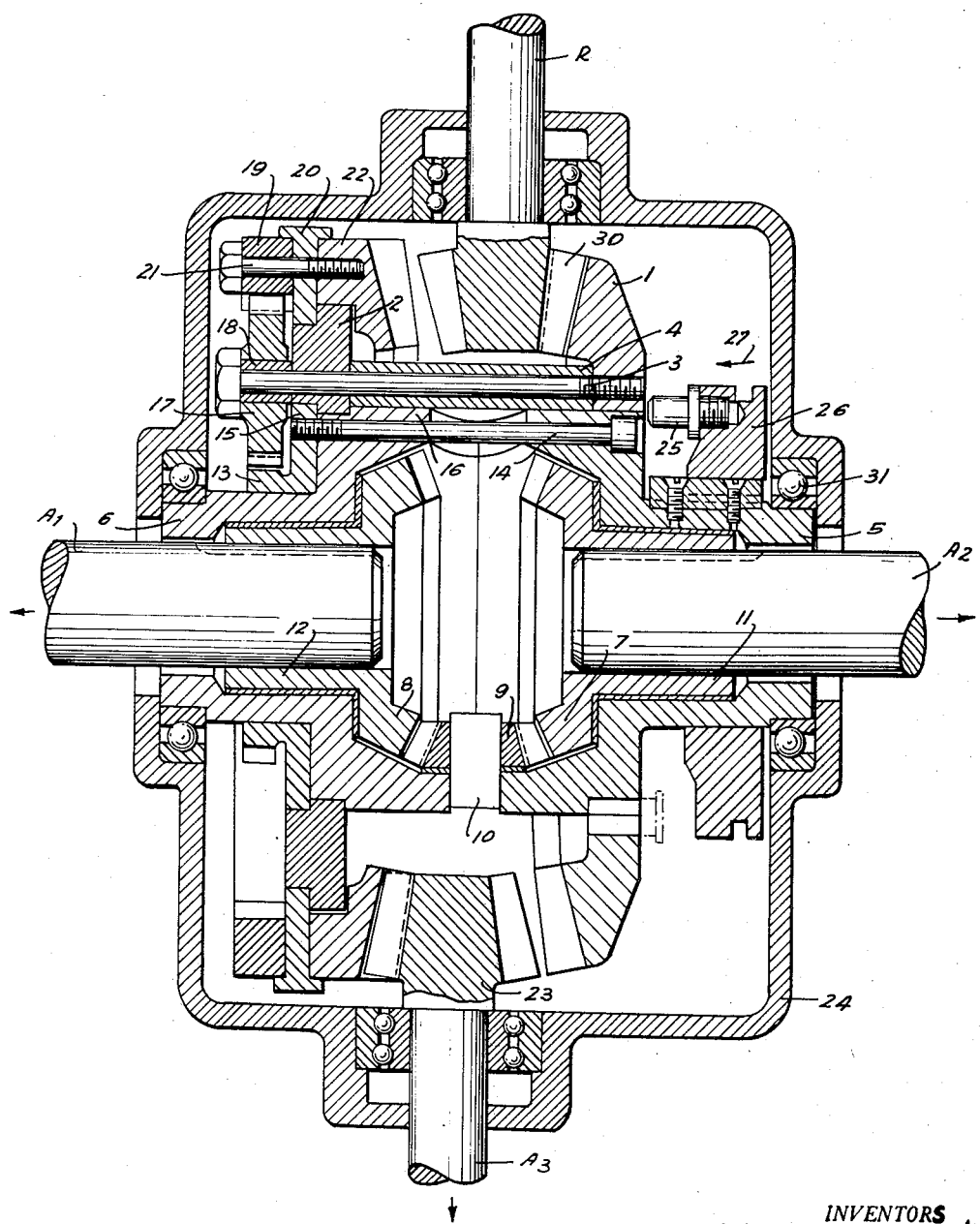
INVENTORS
Wolfgang Hütter and
BY Kaspar Ritter
Michael S. Striker
ATTORNEY United States Patent Office 2,828,650
Patented Apr. 1, 1958

2,828,650

DIFFERENTIAL TRANSMISSION ARRANGEMENT

Wolfgang Hütter, Uhingen, Wurttemberg, and Kaspar Ritter, Kirchheim, Teck, Germany, assignors to Allgaier-Werke G. m. b. H., Uhingen, Wurttemberg, Germany Application May 21, 1956, Serial No. 586,204

Claims priority, application Germany May 21, 1955

15 Claims. (Cl. 74—695)

The present invention relates to a differential transmission arrangement, and more particularly to a differential transmission arrangement including two differentials for driving three driven shafts from a drive shaft.

The arrangement of the present invention is preferably used for dividing the power supplied by drive shaft means between two axle shafts and a third driven shaft, which may be a power take-off shaft.

It is known to provide two differentials in transmissions having three driven shafts for the purpose of driving such shafts at unchanged distribution of the torque even if the rotary speeds of the shafts deviate from the normal value.

However, the differential transmission arrangements of this type according to the known art have the disadvantage that they require a great deal of space.

It is one object of the present invention to overcome this disadvantage of the prior art constructions, and to provide a differential transmission arrangement which requires only little space and can be easily built into a housing of small dimensions.

It is another object of the present invention to provide a compact differential transmission arrangement which is suitable for a motor propelled car and adapted for distributing the power supplied by drive shafts between two axle shafts and a power take-off shaft.

It is a further object of the present invention to provide an additional differential in the housing enclosing a differential for driving a pair of axle shafts without increasing the size of the housing.

It is a further object of the present invention to use the space available in a differential housing for placing therein another differential through which an additional driven shaft is driven.

With these objects in view, the present invention mainly consists in a differential transmission arrangement which comprises, in combination, a housing; a first differential turnably mounted in the housing for rotation about an axis and driving a pair of axle shafts; an annular drive gear coaxial with and surrounding the first differential and being turnable relative to the same; a drive shaft means including a drive pinion meshing with the annular drive gear; a driven shaft means; and a second differential coaxial with and surrounding said first differential, the second differential being located in said housing laterally of said annular drive gear and connecting the first differential, the annular drive gear, and the driven shaft means so that the drive power is distributed in a selected ratio between the axle shaft and said driven shaft means. Due to the fact that the second differential which preferably includes an internal orbit gear, is located adjacent the annular drive gear, the annular space in the housing between the first differential and the annular drive gear is completely utilized so that two differentials can be arranged in the housing without requiring increase of the size of the housing.

A particular advantage of the differential transmission arrangement according to the present invention resides in that by means of the second differential, the driving torque can be distributed in any desired and selected ratio between the two axle shafts and the driven shaft, which may be a power take-off shaft. According to a preferred embodiment of the present invention, the two differentials of the transmission are connected by coupling means to be locked to each other whenever desired, whereby undesired relative rotation between the three driven shafts may be eliminated in the event that the load torques are very different, or do not occur at all.

In accordance with a preferred embodiment of the present invention, the drive shaft means and driven shaft means extend from opposite sides into the housing, and include pinions which are located between two annular bevel gears. One of the bevel gears supports the spider of the second differential, whereas the other bevel gear supports the orbit gear of the second differential. The sun gear of the second differential is fixedly secured to the differential case of the first differential. The sun gear and the planetary gears of the second differential are preferably spur gears, and the orbit gear cooperating with the planetary gears is internal gear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing which is a sectional view of a differential transmission arrangement according to the present invention.

Referring now to the drawing, the drive shaft R, which may be the universal joint shaft of a motor car, drives through a bevel drive pinion 30 an annular bevel gear 1. The power supplied by the drive shaft means R is to be distributed between two axle shafts indicated by reference characters $A_1$ and $A_2$ and a driven shaft indicated by the arrow $A_3$ which may be a power take-off shaft.

The annular bevel gear 1 is turnably mounted on the differential case 5, 6. The end portions of the differential case 5, 6 are turnably supported in the housing 24 on ball bearings 31.

The annular gear 1 is connected by bolt means 3 and sleeve 4 to a spider ring member 2. Bolts 4, of which only one is shown in the drawing, extend further through planetary gear means 17 which are turnable on a bushing 18 spacing the head of bolt 3 from the spider ring member 2. Members 3 and 4 constitute supporting means for supporting the spider ring 2, and also support the planetary gear means 17 on the spider ring 2. The planetary gear means 17 of which only one is shown in the drawing, mesh with a sun gear 13 which is fixedly secured to the differential casing 6. The planetary gears 17 also mesh with an annular internal orbit gear 19 which is secured by screw bolts 21 to another annular bevel gear 22. An annular member 20 is located between the orbit gear 19 and the bevel gear 22, and is turnably supported on a cylindrical bearing face of the spider ring member 2. It will be understood, that the orbit gear 19, the annular member 20, the two bevel gears 1 and 22, and the sun gear 13 are coaxial with the differential casing 5, 6. The sun gear 13 is secured to the differential case 5, 6, by bolts 14. The flange 15 of the sun gear 13 engages an annular shoulder on the spider ring member 2 preventing axial movement of the same. A shoulder 16 on the differential case 5, 6 engages the other side of the spider ring member 2 and prevents movement of the same in opposite direction. Thereby, the axial position of the planetary gear means 17 and of the bevel gear 1 is also determined.

The bevel gear 22 has a toothed face located opposite the toothed face of the bevel gear 1, and has substantially the same outer diameter. The driven shaft $A_3$ has a driven pinion 23 meshing with the annular bevel gear 22. The axes of shafts R and $A_3$ are parallel to each other and do not coincide. The driven shaft $A_3$ may be a power take-off shaft.

Within the differential case 5, 6, are arranged a pair of differential side gears 7 and 8 which have splined inner surfaces adapted to be coupled to axle shafts as indicated by the arrows $A_1$, and $A_2$. Planetary gear means, of which only one planetary gear 10 is shown, are provided and connect in a known manner the differential case 5, 6 with the differential side gears 7 and 8.

It will be understood that the functions of shafts R and $A_3$ are interchangeable. Assuming shaft R to be the drive shaft, the bevel gear 1 is driven through pinion 30, and effects rotation of the spider 2 on which the planetary gears 17 are mounted. The driving power is transmitted on one hand to the differential case 5, 6 through the sun gear 13, and on the other hand through orbit gear 19 to the bevel gear 22 from which the driven shaft $A_3$ is driven. Thereby the power is distributed between the driven shaft and the differential case 5, 6. Within the differential case, the power is further distributed through the planetary gears 10 to the two differential side gears 7 and 8 with hub portions 11 and 12 and to the two axle shafts $A_1$ and $A_2$.

A coupling means is provided for locking the bevel gear 1 to the differential case 5, 6, whereby the second differential 13, 17, 19 can be rendered ineffective. On the portion 5 of the differential case is mounted a coupling member 26 shiftable in the direction of arrow 27 in axial direction. Coupling member 26 carries locking pin means 25 for engaging a recess 25′, formed by two matching recesses in the bevel gear 1 and in the differential case 5, when the coupling member 26 is shifted to the left in the drawing into a locking position. The drawing shows the coupling means 26, 14 in a releasing position in which the second differential 13, 17, 19 is effective.

Due to the fact that the second differential including the members 2, 13, 17 and 19 is arranged in the annular housing portion between the drive gear means 1 and 30 and the lateral wall of the housing, the available space in the housing is fully utilized without requiring an increased size of the housing. Furthermore, the orbit gear 19, the bevel gear 22, and bevel gear 1 have substantially the same diameter which also results in a perfect utilization of the available space. In order to permit the arrangement of the second differential in the available space of the housing, the supporting bolt means 14 pass through the central opening of the bevel gear 22, and support the spider ring member 2 on the side of bevel gear 22 which is remote from the bevel gear 1.

It will be understood that each of the elements described above, or two or more together, may also find a useful application in other types of differential transmission arrangements differing from the types described above.

While the invention has been illustrated and described as embodied in a differential transmission arrangement for driving three shafts through two differentials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A differential transmission arrangement comprising, in combination, a housing; a first differential including a differential case turnably mounted in said housing for rotation about an axis, said first differential being adapted to drive a pair of axle shafts; an annular drive gear coaxial with and surrounding said first differential and being turnable relative to the same; a drive shaft means including a drive pinion meshing with said annular drive gear; a driven shaft means; a second differential including a sun gear coaxial with and fixedly connected to said differential case, and an orbit gear coaxial with and surrounding said first differential and being located in said housing laterally of said annular drive gear, said second differential connecting said first differential, said annular drive gear, and said driven shaft means so that the drive power is distributed in a selected ratio between the axle shafts and said driven shaft means; and releasable coupling means for locking said annular drive gear to said differential case whereby said second differential is rendered ineffective.

2. A differential transmission arrangement comprising, in combination, a housing; a first differential including a differential case turnably mounted in said housing for rotation about an axis, said first differential being adapted to drive a pair of axle shafts; an annular drive gear coaxial with and mounted on said differential case for turning movement relative to the same; drive shaft means including a drive pinion meshing with the annular drive gear; a driven shaft means; a second differential located in said housing and including a sun gear coaxial with and fixedly connected to said differential case axially spaced from said drive gear, planetary gear means mounted on said annular drive gear, and an orbit gear meshing with said planetary gear means, said orbit gear having substantially the same outer diameter as and being located laterally of said annular drive gear; and gear means connecting said orbit gear with said driven shaft means.

3. A differential transmission arrangement comprising, in combination, a housing; a first differential including a differential case turnably mounted in said housing for rotation about an axis, said first differential being adapted to drive a pair of axle shafts; an annular drive gear coaxial with and mounted on said differential case for turning movement relative to the same; drive shaft means including a drive pinion meshing with the annular drive gear; a driven shaft means; a second differential located in said housing and including a spur sun gear coaxial with and fixedly connected to said differential case axially spaced from said drive gear, planetary spur gear means mounted on said annular drive gear, and an internal orbit gear meshing with said planetary gear means, said orbit gear having substantially the same outer diameter as and being located laterally of said annular drive gear; and gear means connecting said orbit gear with said driven shaft means.

4. A differential transmission arrangement, comprising, in combination, a housing; a first differential including a differential case turnably mounted in said housing for rotation about an axis, said first differential being adapted to drive a pair of axle shafts; a pair of annular gears located in said housing surrounding said differential case and being coaxial with the same, one of said annular gears being mounted on said differential case for turning movement relative to the same; a second differential including a sun gear coaxial with and fixedly mounted on said differential case spaced in axial direction from said one annular gear and having a diameter smaller than the same, planetary gear means supported on said one annular gear for turning movement, and an orbit gear fixedly connected to the other annular gear and being located adjacent the same in axial direction on the side remote from said one annular gear; and drive shaft means and driven shaft means, each of said last mentioned shaft means including a pinion, said pinions respectively meshing with said annular gears.

5. A differential transmission arrangement, comprising, in combination, a housing; a first differential including a differential case turnably mounted in said housing for rotation about an axis, said first differential being adapted to drive a pair of axle shafts; a pair of annular bevel gears of substantially equal diameter having toothed faces facing each other, said annular bevel gears being located in said housing surrounding said differential case and being coaxial with the same, one of said annular gears being mounted on said differential case for turning movement relative to the same; a second differential including a sun gear coaxial with and fixedly mounted on said differential case spaced in axial direction from said one annular gear and having a diameter smaller than the same, planetary gear means, a spider ring member supporting said planetary gear means and being turnably mounted on said differential case, and an orbit gear fixedly connected to the other annular bevel gear and being located adjacent the same in axial direction on the side remote from said one annular bevel gear, said orbit gear and said other annular bevel gear being mounted on said spider ring member for turning movement about said axis; drive shaft means and driven shaft means, each of said last mentioned shaft means including a pinion located between said toothed faces of said annular bevel gears, one of said pinions meshing with one of said annular bevel gears and the other of said pinions meshing with the other of said annular bevel gears; and supporting means fixedly secured to said one annular bevel gear passing through the central opening of said other bevel gear and being fixedly connected to said spider ring member so that said spider ring member turns with said one annular bevel gear.

6. A differential transmission arrangement comprising, in combination, a housing; a first differential including a differential case turnably mounted in said housing for rotation about an axis, said first differential being adapted to drive a pair of axle shafts; a pair of annular bevel gears of substantially equal diameter having toothed faces facing each other, said annular bevel gears being located in said housing surrounding said differential case and being coaxial with the same, one of said annular gears being mounted on said differential case for turning movement relative to the same; a second differential including a spur sun gear coaxial with and fixedly mounted on said differential case spaced in axial direction from said one annular gear and having a diameter smaller than the same, planetary spur gear means, a spider ring member supporting said planetary gear means and being turnably mounted on said differential case, and an internal orbit gear fixedly connected to the other annular bevel gear and being located adjacent the same in axial direction on the side remote from said one annular bevel gear, said orbit gear and said other annular bevel gear being mounted on said spider ring member for turning movement about said axis; drive shaft means and driven shaft means, each of said last mentioned shaft means including a pinion located between said toothed faces of said annular bevel gears, one of said pinions meshing with one of said annular bevel gears and the other of said pinions meshing with the other of said annular bevel gears; and supporting means fixedly secured to said one annular bevel gear passing through the central opening of said other bevel gear and being fixedly connected to said spider ring member so that said spider ring member turns with said one annular bevel gear.

7. A differential transmission arrangement comprising, in combination, a housing; a first differential including a differential case turnably mounted in said housing for rotation about an axis, said first differential being adapted to drive a pair of axle shafts; a pair of annular bevel gears of substantially equal diameter having toothed faces facing each other, said annular bevel gears being located in said housing surrounding said differential case and being coaxial with the same, one of said annular gears being mounted on said differential case for turning movement relative to the same; a second differential including a spur sun gear coaxial with and fixedly mounted on said differential case spaced in axial direction from said one annular gear and having a diameter smaller than the same, planetary spur gear means, a spider ring member supporting said planetary gear means and being turnably mounted on said differential case, and an internal orbit gear fixedly connected to the other annular bevel gear and being located adjacent the same in axial direction on the side remote from said one annular bevel gear, said orbit gear and said other annular bevel gear being mounted on said spider ring member for turning movement about said axis; drive shaft means having an axis transverse to said axis of said first differential, and including a drive bevel pinion meshing with said one annular bevel gear and being located between said toothed faces of said annular bevel gears; driven shaft means having an axis parallel to the axis of said drive shaft means and including a driven bevel gear meshing with said other annular bevel gear and being located between the toothed faces of said annular bevel gears; and supporting means fixedly secured to said one annular bevel gear passing through the central opening of said other bevel gear and being fixedly connected to said spider ring member so that said spider ring member turns with said one annular bevel gear.

8. A differential transmission arrangement comprising, in combination, a housing; a first differential including a differential case turnably mounted in said housing for rotation about an axis, said first differential being adapted to drive a pair of axle shafts; a pair of annular bevel gears of substantially equal diameter having toothed faces facing each other, said annular bevel gears being located in said housing surrounding said differential case and being coaxial with the same, one of said annular gears being mounted on said differential case for turning movement relative to the same; a second differential including a spur sun gear coaxial with and fixedly mounted on said differential case spaced in axial direction from said one annular gear and having a diameter smaller than the same, planetary spur gear means, a spider ring member supporting said planetary gear means and being turnably mounted on said differential case, and an internal orbit gear fixedly connected to the other annular bevel gear and being located adjacent the same in axial direction on the side remote from said one annular bevel gear, said orbit gear and said other annular bevel gear being mounted on said spider ring member for turning movement about said axis; drive shaft means and driven shaft means, each of said last mentioned shaft means including a pinion located between said toothed faces of said annular bevel gears, one of said pinions meshing with one of said annular bevel gears and the other of said pinions meshing with the other of said annular bevel gears; supporting means fixedly secured to said one annular bevel gear passing through the central opening of said other bevel gear and being fixedly connected to said spider ring member so that said spider ring member turns with said one annular bevel gear; and coupling means for locking said one annular bevel gear to said differential case.

9. A differential transmission arrangement as set forth in claim 8 wherein said coupling means includes a coupling member mounted on said differential casing for movement in axial direction between a releasing position and a locking position, and locking pin means, said locking pin means engaging said one annular bevel gear and said differential case in said locking position of said coupling member.

10. A differential transmission arrangement as set forth in claim 6 wherein said supporting means include bolt means threaded into said one annular bevel gear and extending through the central opening of said other annular bevel gear; sleeve means surrounding said bolt means and spacing said spider ring member from said one annular bevel gear means; and bushing means abutting against said spider ring member and surrounding said bolt means for turnably supporting said planetary gear means.

11. A differential transmission arrangement as set forth in claim 10 and including an annular member located between said orbit gear and said other bevel gear and being turnably supported on said spider ring member; and means for securing said orbit gear, said annular member, and said other bevel gear to each other.

12. A differential transmission arrangement as set forth in claim 6 and including an annular member located between said orbit gear and said other bevel gear and being turnably supported on said spider ring member; and means for securing said orbit gear, said annular member, and said other bevel gear to each other.

13. A differential transmission arrangement comprising, in combination, a housing; a first differential including a differential case turnably mounted in said housing for rotation about an axis, said first differential being adapted to drive a pair of axle shafts; a pair of annular gears located in said housing surrounding said differential case and being coaxial with the same, one of said annular gears being mounted on said differential case for turning movement relative to the same; a second differential including a sun gear coaxial with and fixedly mounted on said differential case spaced in axial direction from said one annular gear and having a diameter smaller than the same, planetary gear means supported on said one annular gear for turning movement, and an orbit gear fixedly connected to the other annular gear and being located adjacent the same in axial direction on the side remote from said one annular gear, said orbit gear and said annular gears having substantially the same outer diameters; and drive shaft means and driven shaft means, each of said last mentioned shaft means including pinion, said pinions respectively meshing with said annular gears.

14. A differential transmission arrangement comprising, in combination, a housing; a first differential including a differential case turnably mounted in said housing for rotation about an axis, said first differential being adapted to drive a pair of axle shafts; a pair of annular bevel gears of substantially equal diameter having toothed faces facing each other, said annular bevel gears being located in said housing surrounding said differential case and being coaxial with the same, one of said annular gears being mounted on said differential case for turning movement relative to the same; a second differential including a spur sun gear coaxial with and fixedly mounted on said differential case spaced in axial direction from said one annular gear and having a diameter smaller than the same, planetary spur gear means, a spider ring member supporting said planetary gear means and being turnably mounted on said differential case, and an internal orbit gear fixedly connected to the other annular bevel gear and being located adjacent the same in axial direction on the side remote from said one annular bevel gear, said orbit gear and said other annular bevel gear being mounted on said spider ring member for turning movement about said axis, said orbit gear and said bevel gears having substantially the same outer diameters; drive shaft means and driven shaft means, each of said last mentioned shaft means including a pinion located between said toothed faces of said annular bevel gears, one of said pinions meshing with one of said annular bevel gears and the other of said pinions meshing with the other of said annular bevel gears; and supporting means fixedly secured to said one annular bevel gear passing through the central opening of said other bevel gear and being fixedly connected to said spider ring member so that said spider ring member turns with said one annular bevel gear.

15. A differential transmission arrangement as set forth in claim 14 and including an annular member located between said orbit gear and said other bevel gear and being turnably supported on said spider ring member; and means for securing said orbit gear, said annular member, and said other bevel gear to each other.

References Cited in the file of this patent

FOREIGN PATENTS 396,002     France                Jan. 13, 1909